United States Patent
Jeong et al.

(10) Patent No.: US 10,062,902 B2
(45) Date of Patent: Aug. 28, 2018

(54) POSITIVE ELECTRODE FOR SECONDARY BATTERIES AND SECONDARY BATTERY INCLUDING THE SAME

(71) Applicant: LG Chem, Ltd., Seoul (KR)

(72) Inventors: Won Hee Jeong, Daejeon (KR); Su Hwan Kim, Daejeon (KR); Sin Kyu Kim, Daejeon (KR); Kyungkoo Lee, Daejeon (KR); Jae Hyun Lee, Daejeon (KR); Sun Jung Hwang, Daejeon (KR); Geun Chang Chung, Daejeon (KR)

(73) Assignee: LG Chem, Ltd. (KR)

( * ) Notice: Subject to any disclaimer, the term of this patent is extended or adjusted under 35 U.S.C. 154(b) by 85 days.

(21) Appl. No.: 14/913,047

(22) PCT Filed: Sep. 2, 2014

(86) PCT No.: PCT/KR2014/008182
§ 371 (c)(1),
(2) Date: Feb. 19, 2016

(87) PCT Pub. No.: WO2015/030561
PCT Pub. Date: Mar. 5, 2015

(65) Prior Publication Data
US 2016/0204423 A1    Jul. 14, 2016

(30) Foreign Application Priority Data

Sep. 2, 2013    (KR) .......................... 10-2013-0104657

(51) Int. Cl.
*H01M 4/131*    (2010.01)
*H01M 4/136*    (2010.01)
(Continued)

(52) U.S. Cl.
CPC ......... *H01M 4/366* (2013.01); *H01M 4/0404* (2013.01); *H01M 4/0435* (2013.01);
(Continued)

(58) Field of Classification Search
CPC ............. H01M 4/30; H01M 4/36; H01M 4/58
See application file for complete search history.

(56) References Cited

U.S. PATENT DOCUMENTS

| | | | |
|---|---|---|---|
| 2006/0115730 A1* | 6/2006 | Taniguchi | H01M 4/131 429/217 |
| 2010/0112449 A1* | 5/2010 | Fujita | H01M 4/13 429/231 |

(Continued)

FOREIGN PATENT DOCUMENTS

| | | |
|---|---|---|
| CN | 102683696 A | 9/2012 |
| CN | 103493257 A | 1/2014 |

(Continued)

OTHER PUBLICATIONS

Extended European Search Report for Application No. 14839735.9, dated Nov. 28, 2016.

(Continued)

*Primary Examiner* — James Lee
(74) *Attorney, Agent, or Firm* — Lerner, David, Littenberg, Krumholz & Mentlik, LLP

(57) ABSTRACT

Disclosed is a positive electrode for secondary batteries manufactured by coating and rolling a slurry for a positive electrode mix including positive electrode active material particles on a current collector, wherein the positive electrode active material particles include one or more selected from the group consisting of lithium iron phosphate particles having an olivine crystal structure and lithium nickel-manganese-cobalt composite oxide particles according to Formula 1, the lithium nickel-manganese-cobalt composite (Continued)

oxide particles existing as secondary particles formed by agglomeration of primary particles, in an amount of greater than 50% and less than 90% based on the total volume of lithium nickel-manganese-cobalt composite oxide, and the lithium iron phosphate particles existing as primary particles in an amount of greater than 50% and less than 100% based on the total volume of lithium iron phosphate (Formula 1 is the same as defined in Claim 1).

19 Claims, 2 Drawing Sheets

(51) Int. Cl.
| | |
|---|---|
| H01M 4/505 | (2010.01) |
| H01M 4/525 | (2010.01) |
| H01M 4/36 | (2006.01) |
| H01M 4/62 | (2006.01) |
| H01M 4/66 | (2006.01) |
| H01M 10/0525 | (2010.01) |
| H01M 4/04 | (2006.01) |
| H01M 4/58 | (2010.01) |
| H01M 4/02 | (2006.01) |
| H01M 10/052 | (2010.01) |

(52) U.S. Cl.
CPC .......... *H01M 4/131* (2013.01); *H01M 4/136* (2013.01); *H01M 4/364* (2013.01); *H01M 4/505* (2013.01); *H01M 4/525* (2013.01); *H01M 4/5825* (2013.01); *H01M 4/624* (2013.01); *H01M 4/625* (2013.01); *H01M 4/661* (2013.01); *H01M 10/0525* (2013.01); *H01M 10/052* (2013.01); *H01M 2004/021* (2013.01); *H01M 2004/028* (2013.01); *H01M 2220/10* (2013.01); *H01M 2220/20* (2013.01)

(56) References Cited

U.S. PATENT DOCUMENTS

| | | |
|---|---|---|
| 2010/0233540 A1 | 9/2010 | Choy et al. |
| 2010/0310940 A1 | 12/2010 | Kim et al. |
| 2011/0086274 A1 | 4/2011 | Chang et al. |
| 2011/0287315 A1 | 11/2011 | Choy et al. |
| 2012/0064408 A1 | 3/2012 | Song et al. |
| 2012/0231341 A1 | 9/2012 | Kim et al. |
| 2013/0280610 A1 | 10/2013 | Hwang et al. |
| 2014/0212756 A1 | 7/2014 | Sakaguchi et al. |

FOREIGN PATENT DOCUMENTS

| | | |
|---|---|---|
| EP | 2677569 A1 | 12/2013 |
| JP | 2011105594 A | 6/2011 |
| JP | 2012506611 A | 3/2012 |
| JP | 2012190786 A | 10/2012 |
| JP | 2012216473 A | 11/2012 |
| JP | 2013137923 A | 7/2013 |
| KR | 20070105266 A | 10/2007 |
| KR | 20100044713 A | 4/2010 |
| KR | 20100052116 A | 5/2010 |
| KR | 20120026822 A | 3/2012 |
| KR | 20120104484 A | 9/2012 |

OTHER PUBLICATIONS

International Search Report for Application No. PCT/KR2014/008182 dated Dec. 12, 2014.

* cited by examiner

[FIG. 1]
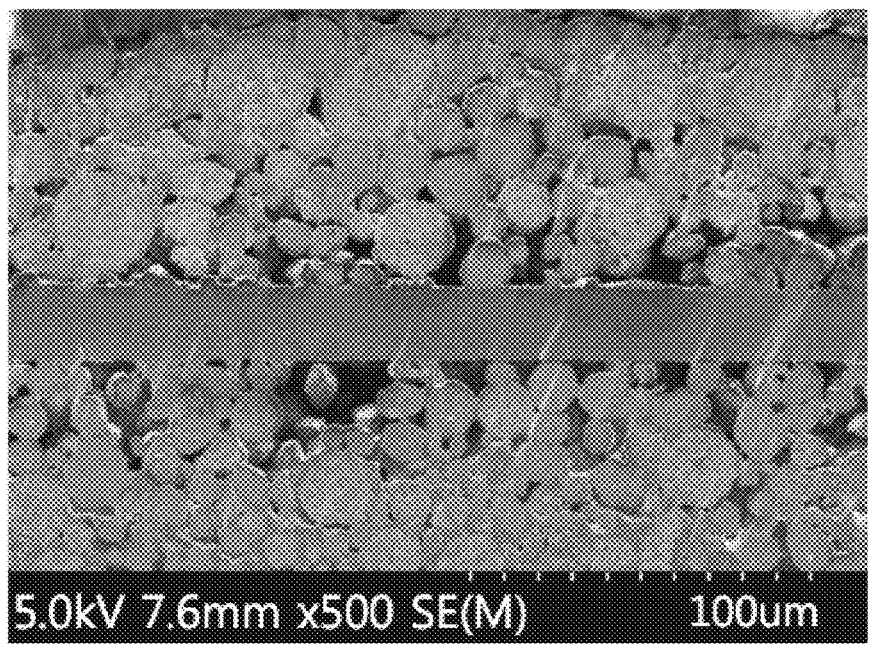
[FIG. 2]
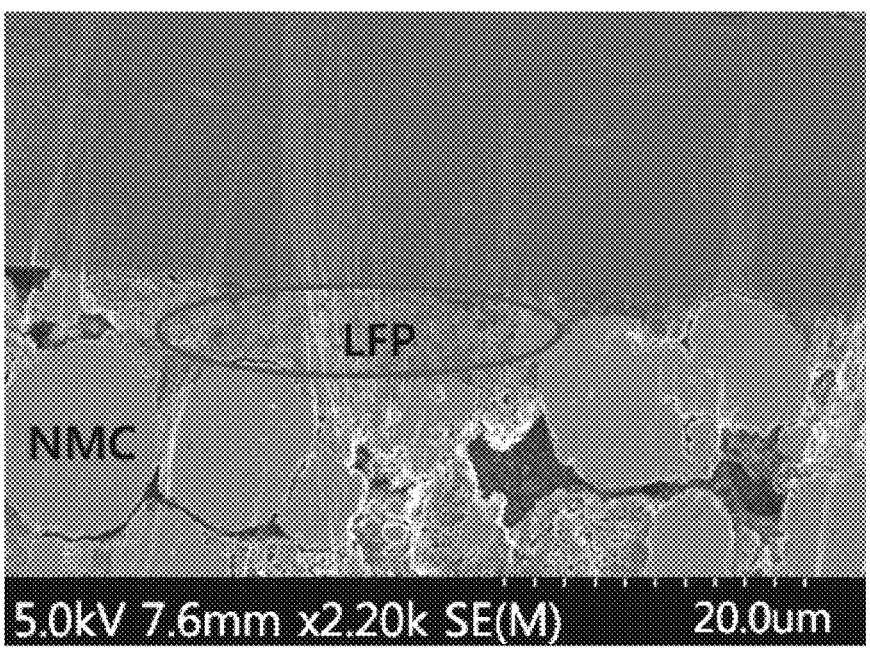

[FIG. 3]
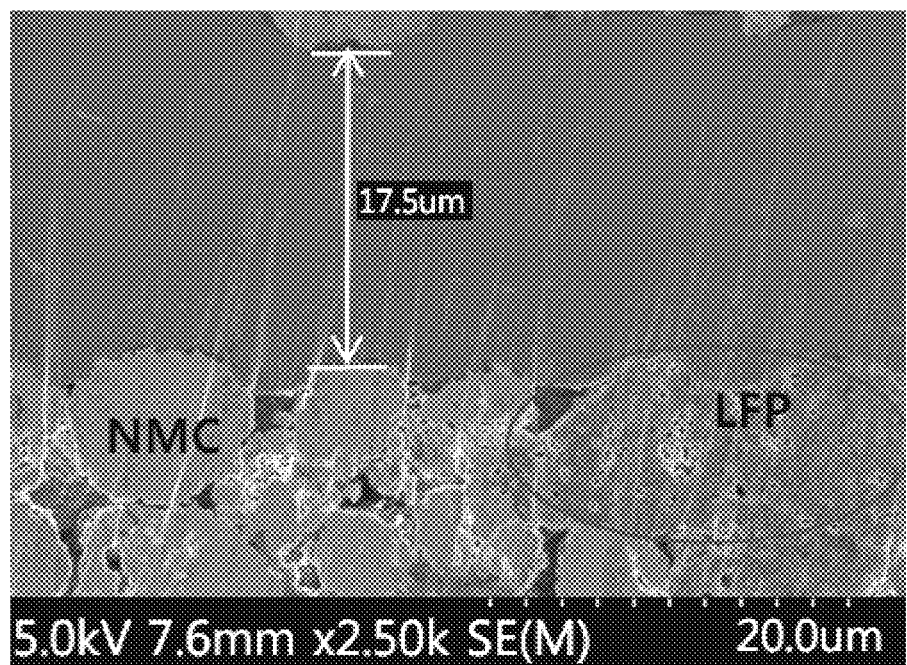

POSITIVE ELECTRODE FOR SECONDARY BATTERIES AND SECONDARY BATTERY INCLUDING THE SAME

CROSS REFERENCE TO RELATED APPLICATIONS

The present application is a national phase entry under 35 U.S.C. § 371 of International Application No. PCT/KR2014/008182, filed Sep. 2, 2014, published in Korean, which claims the benefit of Korean Patent Application No. 10-2013-0104657, filed Sep. 2, 2013. The disclosures of said applications are incorporated by reference herein.

TECHNICAL FIELD

The present invention relates to a positive electrode for secondary batteries and a secondary battery including the same.

BACKGROUND ART

As energy source prices are increasing due to depletion of fossil fuels and interest in environmental pollution is escalating, demand for environmentally-friendly alternative energy sources is bound to play an increasing role in future life. Thus, research into various power generation techniques such as nuclear energy, solar energy, wind energy, tidal power, and the like, is underway, and power storage devices for more efficient use of the generated energy are also drawing much attention.

In particular, demand for lithium secondary batteries as energy sources is rapidly increasing as mobile device technology continues to develop and demand therefor continues to increase. Recently, use of lithium secondary batteries as a power source of electric vehicles (EVs) and hybrid electric vehicles (HEVs) has been realized and the market for lithium secondary batteries continues to expand to applications such as auxiliary power supplies through smart-grid technology.

In general, lithium secondary batteries has a structure wherein an electrode assembly, composed of a positive electrode including a positive electrode active material, a negative electrode including a negative electrode active material and a porous separator, is impregnated with a lithium electrolyte. A positive electrode is manufactured by coating a positive electrode mix including a positive electrode active material on an aluminum foil, and a negative electrode is manufactured by coating a negative electrode mix including a negative electrode active material on copper foil.

In such lithium secondary batteries, carbon-based materials are mainly used as a negative electrode active material, and use of lithium metals, sulfur compounds, silicon compounds, tin compounds, etc. is also considered. In addition, lithium-containing cobalt oxides such as $LiCoO_2$ are mainly used as a positive electrode active material. In addition thereto, use of lithium-containing manganese oxides such as $LiMnO_2$ having a layered crystal structure, $LiMn_2O_4$ having a spinel crystal structure and the like, and lithium-containing nickel oxides such as $LiNiO_2$ is also under consideration.

$LiCoO_2$ is widely used due to excellent overall physical properties such as excellent cycle properties, but low in safety. In addition, due to resource limitation of cobalt as a raw material, $LiCoO_2$ is expensive and massive use thereof as a power source in fields such as electric vehicles and the like is limited. Due to characteristics of preparation methods of $LiNiO_2$, it is difficult to apply $LiNiO_2$ to mass production at reasonable expenses. In addition, lithium manganese oxides such as $LiMnO_2$ and $LiMn_2O_4$ have disadvantages such as poor cycle characteristics.

Accordingly, a method of using a lithium transition metal phosphate as a positive electrode active material is under study. The lithium transition metal phosphate is broadly classified into $Li_xM_2(PO_4)_3$ having a NaSICON structure and $LiMPO_4$ having an olivine structure, and considered as a material having superior stability, when compared with existing $LiCoO_2$. At present, $Li_3V_2(PO_4)_3$ having a NaSICON structure is known, and $LiFePO_4$ and $Li(Mn, Fe)PO_4$ among compounds having an olivine structure are most broadly studied.

Among compounds having the olivine structure, $LiFePO_4$ has a voltage of 3.5 V and a high bulk density of 3.6 g/cm³ with respect to lithium, and a theoretical capacity of 170 mAh/g. In addition, $LiFePO_4$ has superior high-temperature stability, compared to cobalt (Co), and uses cheap Fe as a raw material. Accordingly, applicability of $LiFePO_4$ as a positive electrode active material for lithium secondary batteries is high.

However, such $LiFePO_4$ has problems as follows, and thus, commercialization thereof is limited.

First, internal resistance of a battery increases due to low electron conductivity of $LiFePO_4$ when $LiFePO_4$ is used as a positive electrode active material. Accordingly, polarized potential increases when battery circuits are closed, thereby resulting in reduction of battery capacity.

Second, since $LiFePO_4$ has lower density than general positive electrode active materials, it is limited to sufficiently increase energy density of a battery.

Third, since an olivine crystal structure in which lithium is desorbed is very unstable, a migration pathway of a crystal surface in which lithium is desorbed is blocked, whereby absorption/desorption rates of lithium are decreased.

Accordingly, technology to shorten migration distances of lithium ions by reducing a crystal size of olivine to a nanoscale, thus increasing a discharge capacity, has been suggested.

However, when an electrode is manufactured using such olivine particles having minute diameter sizes, a large amount of binder should be used and time of mixing a slurry is extended, thereby decreasing process efficiency. When secondary particles in which primary nanoparticles are physically agglomerated are used to address such problems, processability is enhanced, but battery capacity characteristics and output characteristics may be deteriorated due to the diffusion rate of lithium cations in the secondary particles which is slower than that in primary particles.

Therefore, there is an urgent need for technology to provide high process efficiency while providing superior battery performance.

DISCLOSURE

Technical Problem

Therefore, the present invention has been made to solve the above and other technical problems that have yet to be resolved.

As a result of a variety of extensive and intensive studies and experiments, the inventors of the present invention confirmed that desired effects may be accomplished when a positive electrode for secondary batteries manufactured using a slurry for a positive electrode mix including lithium iron phosphate particles and/or lithium nickel-manganesecobalt composite oxide particles having a predetermined particle shape, namely, an olivine crystal structure, is used, thus completing the present invention.

Technical Solution

In accordance with one aspect of the present invention, provided is a positive electrode for secondary batteries manufactured by coating and rolling a slurry for a positive electrode mix including positive electrode active material particles on a current collector, wherein the positive electrode active material particles include one or more selected from the group consisting of lithium iron phosphate particles having an olivine crystal structure and lithium nickel-manganese-cobalt composite oxide particles according to Formula 1, the lithium nickel-manganese-cobalt composite oxide particles existing as secondary particles formed by agglomeration of primary particles, in an amount of greater than 50% and less than 90% based on the total volume of lithium nickel-manganese-cobalt composite oxide, and the lithium iron phosphate particles existing as primary particles in an amount of greater than 50% and less than 100% based on the total volume of lithium iron phosphate:

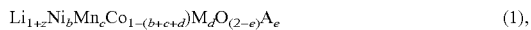

$$Li_{1+z}Ni_bMn_cCo_{1-(b+c+d)}M_dO_{2-e}A_e \quad (1),$$

wherein −0.5≤z≤0.5, 0.1≤b≤0.8, 0.1≤c≤0.8, 0≤d≤0.2, 0≤e≤0.2, b+c+d<1, M is Al, Mg, Cr, Ti, Si or Y, and A is F, P or Cl.

In general, when lithium iron phosphate particles having a several-nanometer-size olivine crystal structure as a primary particle type are used as a positive electrode active material, process efficiency is decreased. When secondary particles formed through agglomeration of primary particles are used to address such a problem, a distance to the core of secondary particles is too long for lithium ions to be diffused thereinto and inner portions of secondary particles might not be coated. Accordingly, overall battery performance, such as conductivity, may be deteriorated.

Accordingly, the present inventors confirmed that, even when a positive electrode including lithium iron phosphate particles having a secondary particle-shape olivine crystal structure is manufactured, secondary particles are partially collapsed and may be returned to primary particles in a rolling process, whereby diffusivility of lithium ions is increased.

That is, since the lithium iron phosphate particles having an olivine crystal structure according to the present invention have a secondary particle shape, in which primary particles are agglomerated, up to a mixing process of a positive electrode mix slurry and a process of coating on a current collector, energy density may be ultimately maximized due to collapse of secondary particles to primary particles in a rolling process, and battery capacity characteristics and output characteristics may also be enhanced, while enhancing process efficiency.

Such lithium iron phosphate particles having an olivine crystal structure may be used alone, and, particularly, as a mixture with the lithium nickel-manganese-cobalt composite oxide of Formula 1.

In this case, a ratio of the lithium iron phosphate particles to lithium nickel-manganese-cobalt composite oxide particles may be 10:90 to 90:10, particularly 20:80 to 80:20, more particularly 30:70 to 70:30, based on the total weight of positive electrode active material.

When the content of the lithium iron phosphate particles is too low, high-temperature stability may be undesirably deteriorated. When various aspects such as economic efficiency are considered, the lithium iron phosphate particles and lithium nickel-manganese-cobalt composite oxide particles may be used within the range.

In particular, in the positive electrode for secondary batteries according to the present invention, the lithium nickel-manganese-cobalt composite oxide particles may exist as secondary particles formed by agglomeration of primary particles, in an amount of 80% or more and less than 90% based on the total volume of lithium nickel-manganese-cobalt composite oxide, and the lithium iron phosphate particles may exist as primary particles in an amount of 70% or more and less than 100% based on the total volume of lithium iron phosphate.

Since olivine-crystal-structure lithium iron phosphate secondary particles are preferentially collapsed to primary particles in a rolling process of a positive electrode, a ratio of particles of lithium nickel-manganese-cobalt composite oxide secondary particles changed to primary particles is relatively decreased and thus overall battery characteristics may be enhanced. This occurs since the olivine-crystal-structure lithium iron phosphate particles more greatly affect overall battery characteristics.

That is, in regard to a particle change ratio based on volume when positive electrode active material particles in a secondary particle state are changed into primary particles by the rolling, the particle change ratio in the lithium iron phosphate particles may be 70% or more, particularly 80% or more, and the particle change ratio in the lithium nickel-manganese-cobalt composite oxide particles may be 20% or less, particularly 10% or less.

For example, primary particles may be agglomerated through binding in such secondary particles, and the primary particles may be agglomerated by physical bonding such as van der Waals attraction instead of a chemical bond such as a covalent bond or an ionic bond to form secondary particles.

When the average particle diameter of the primary particles is extremely large, desired ionic conductivity might not be exhibited. On the other hand, it is not easy to prepare particles having extremely small diameters. When considering such facts, the average particle diameter (D50) of the primary particles is preferably 50 nm to 550 nm, more preferably 100 nm to 300 nm.

In addition, when the average particle diameter of the secondary particles is too large, a pore ratio between secondary particles increases and thus tap density is decreased. On the other hand, when the average particle diameter of the secondary particles is too small, process efficiency might not be exhibited. Accordingly, the average particle diameter (D50) is preferably 5 micrometers to 100 micrometers. In particularly, when mix of a slurry and smoothness of an electrode surface are considered, the average particle diameter is preferably 5 micrometers to 40 micrometers. When the average particle diameter is too large, sedimentation occurs slowly upon mixing of a slurry.

The specific surface area (BET) of the secondary particles may be 5 to 15 m²/g.

In addition, the shapes of the secondary particles are not specifically limited, but, when tap density is considered, a globular shape is preferable.

In order to increase electronic conductivity, the lithium iron phosphate particles may be coated with a conductive material. The conductive material may be one or more selected from carbon-based materials, noble metals, metals and conductive polymers. In particular, when coated with a carbon-based material, conductivity may be efficiently enhanced without great increase of manufacturing costs and weight.

The weight of the carbon-based material may be 1% to 4% by weight, particularly 2% to 4% by weight, based on a total weight of positive electrode active material.

When the amount of the carbon-based material is too large, the amount of the lithium iron phosphate particles is relatively decreased, whereby overall battery characteristics are deteriorated. When the amount of the carbon-based material is too small, electronic conductivity might not be enhanced.

The conductive material may be coated to a thickness of 1 nanometer or more and 10 nanometers or less.

When the conductive material is too thickly coated, internal resistance may increase. When the conductive material is too thinly coated, electronic conductivity might not be enhanced.

In the present invention, the lithium iron phosphate particles may have a composition of Formula 2 below.

$$Li_{1+a}Fe_{1-x}M_x(PO_{4-b'})X_{b'} \qquad (2),$$

wherein M is one or more selected from Al, Mg and Ti, X is one or more selected from F, S and N, $-0.5 \leq a \leq +0.5$, $0 \leq x \leq 0.5$, and $0 \leq b' \leq 0.1$.

When a, b' and x are outside the ranges, conductivity is decreased or the lithium iron phosphate particles might not maintain an olivine structure, and rate characteristics are deteriorated or capacity may be decreased.

The lithium iron phosphate particles may be particularly $LiFePO_4$, $Li(Fe, Mn)PO_4$, $Li(Fe, Co)PO_4$, $Li(Fe, Ni)PO_4$, etc., more particularly $LiFePO_4$.

In the present invention, the lithium nickel-manganese-cobalt composite oxide of Formula 1 is a lithium oxide simultaneously including nickel, manganese and cobalt, particularly a layered lithium nickel-manganese-cobalt oxide according to Formula 1a below.

$$Li_{1+z}Ni_bMn_cCo_{1-(b+c)}O_2 \qquad (1a)$$

wherein b, c, and z are the same as defined above, but, particularly, the content (b) of the nickel may be $0.3 \leq b \leq 0.65$.

The lithium nickel cobalt manganese composite oxide of Formula 1a including manganese and cobalt includes nickel in an amount of at least of 0.3 mol or more. In an embodiment, examples of the lithium nickel cobalt manganese composite oxide may include $LiNi_{1/3}Co_{1/3}Mn_{1/3}O_2$ and $LiNi_{0.4}Mn_{0.4}Co_{0.2}O_2$, but the present invention is not limited thereto.

3% to 6% by weight of a binder may be included based on the total weight of the positive electrode mix.

The secondary battery according to the present invention includes a positive electrode and a negative electrode manufactured by drying and pressing after spreading a mixture of a negative electrode active material, conductive material and binder on a negative electrode current collector. In this case, as needed, a filler may be further added to the mixture.

The positive electrode current collector is generally fabricated to a thickness of 3 to 500 micrometers. The positive electrode current collector is not particularly limited so long as it does not cause chemical changes in the fabricated lithium secondary battery and has high conductivity. For example, the positive electrode current collector may be made of stainless steel, aluminum, nickel, titanium, sintered carbon, aluminum or stainless steel surface-treated with carbon, nickel, titanium, or silver, or the like. The positive electrode current collector may have minute irregularities at a surface thereof to increase adhesion between the positive electrode active material and the positive electrode current collector. In addition, the positive electrode current collector may be used in any of various forms including films, sheets, foils, nets, porous structures, foams, and non-woven fabrics.

The positive electrode active material may be one of the materials defined above.

The conductive material is generally added in an amount of 1% to 50% by weight based on the total weight of a mixture including a positive electrode active material. There is no particular limit as to the conductive material, so long as it does not cause chemical changes in the fabricated battery and has conductivity. For example, graphite such as natural or artificial graphite; carbon black such as carbon black, acetylene black, Ketjen black, channel black, furnace black, lamp black, and thermal black; conductive fibers such as carbon fibers and metallic fibers; metallic powders such as carbon fluoride powder, aluminum powder, and nickel powder; conductive whiskers such as zinc oxide whiskers and potassium titanate whiskers; conductive metal oxides such as titanium oxide; conductive materials such as polyphenylene derivatives; or the like may be used.

The binder is a component assisting in binding between an active material and the conductive material and in binding of the active material to a current collector. Examples of the binder include, but are not limited to, polyvinylidene fluoride, polyvinyl alcohols, carboxymethylcellulose (CMC), starch, hydroxypropylcellulose, regenerated cellulose, polyvinyl pyrrolidone, tetrafluoroethylene, polyethylene, polypropylene, ethylene-propylene-diene terpolymer (EPDM), sulfonated EPDM, styrene butadiene rubber, fluorine rubber, and various copolymers.

The filler is optionally used as a component to inhibit positive electrode expansion. The filler is not particularly limited so long as it is a fibrous material that does not cause chemical changes in the fabricated battery. Examples of the filler include olefin-based polymers such as polyethylene and polypropylene; and fibrous materials such as glass fiber and carbon fiber.

The negative electrode current collector is typically fabricated to a thickness of 3 to 500 micrometers. The negative electrode current collector is not particularly limited so long as it does not cause chemical changes in the fabricated battery and has conductivity. For example, the negative electrode current collector may be made of copper, stainless steel, aluminum, nickel, titanium, sintered carbon, copper or stainless steel surface-treated with carbon, nickel, titanium, or silver, and aluminum-cadmium alloys. Similar to the positive electrode current collector, the negative electrode current collector may also have fine irregularities at a surface thereof to enhance adhesion between the negative electrode current collector and the negative electrode active material and may be used in various forms including films, sheets, foils, nets, porous structures, foams, and non-woven fabrics.

Examples of the negative electrode active material include carbon such as hard carbon and graphite-based carbon; metal composite oxides such as $Li_xFe_2O_3$ where $0 \leq x \leq 1$, $Li_xWO_2$ where $0 \leq x \leq 1$, $Sn_xMe_{1-x}Me'_yO_z$ where Me: Mn, Fe, Pb, or Ge; Me': Al, B, P, Si, Group I, II and III elements, or halogens; $0 \leq x \leq 1$; $1 \leq y \leq 3$; and $1 \leq z \leq 8$; lithium metals; lithium alloys; silicon-based alloys; tin-based alloys; metal oxides such as $SnO$, $SnO_2$, $PbO$, $PbO_2$, $Pb_2O_3$, $Pb_3O_4$, $Sb_2O_3$, $Sb_2O_4$, $Sb_2O_5$, $GeO$, $GeO_2$, $Bi_2O_3$, $Bi_2O_4$, and $Bi_2O_5$; conductive polymers such as polyacetylene; and Li—Co—Ni-based materials; and the like.

Such a secondary battery may have a structure wherein an electrode assembly, in which a separator is disposed between a positive electrode and a negative electrode, is impregnated with a lithium salt-containing electrolyte.

The separator is disposed between the positive electrode and the negative electrode and, as the separator, a thin insulating film with high ion permeability and high mechanical strength is used. The separator generally has a pore diameter of 0.01 to 10 micrometers and a thickness of 5 to 300 micrometers. As the separator, for example, sheets or non-woven fabrics, made of an olefin-based polymer such as polypropylene; or glass fibers or polyethylene, which have chemical resistance and hydrophobicity, are used. When a solid electrolyte such as a polymer or the like is used as an electrolyte, the solid electrolyte may also serve as a separator.

The lithium salt-containing electrolyte is composed of an electrolyte and a lithium salt. As the electrolyte, a non-aqueous organic solvent, an organic solid electrolyte, an inorganic solid electrolyte or the like may be used, but the present invention is not limited thereto.

Examples of the non-aqueous organic solvent include aprotic organic solvents such as N-methyl-2-pyrrolidone, propylene carbonate, ethylene carbonate, butylene carbonate, dimethyl carbonate, diethyl carbonate, gamma-butyrolactone, 1,2-dimethoxy ethane, tetrahydrofuran, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

Examples of the organic solid electrolyte include polyethylene derivatives, polyethylene oxide derivatives, polypropylene oxide derivatives, phosphoric acid ester polymers, polyagitation lysine, polyester sulfide, polyvinyl alcohols, polyvinylidene fluoride, and polymers containing ionic dissociation groups.

Examples of the inorganic solid electrolyte include, but are not limited to, nitrides, halides and sulfates of lithium (Li) such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, and $Li_3PO_4$—$Li_2S$—$SiS_2$.

The lithium salt is a material that is readily soluble in the non-aqueous electrolyte and examples thereof include, but are not limited to, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, chloroborane lithium, lower aliphatic carboxylic acid lithium, lithium tetraphenyl borate, and imides.

In addition, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride or the like may be added to the electrolyte. If necessary, in order to impart incombustibility, the electrolyte may further include halogen-containing solvents such as carbon tetrachloride and ethylene trifluoride. Further, in order to improve high-temperature storage characteristics, the non-aqueous electrolyte may further include carbon dioxide gas, and fluoro-ethylene carbonate (FEC), propene sultone (PRS) and the like may be further included.

In a preferred embodiment, a lithium salt-containing non-aqueous electrolyte may be prepared by adding a lithium salt such as $LiPF_6$, $LiClO_4$, $LiBF_4$, $LiN(SO_2CF_3)_2$, or the like to a mixed solvent including EC or PC, which is a high dielectric solvent and a cyclic carbonate, and DEC, DMC, or EMC, which are low viscosity solvents and a linear carbonate.

The secondary battery may be a lithium secondary battery.

In addition, the present invention provides a battery module including the secondary battery as a unit cell and a battery pack including the battery module.

The battery pack may be used as a power source of medium/large devices in which high-temperature stability, long-cycle characteristics, high rate characteristics, etc. are required.

Preferred embodiments of the medium/large devices include, but are not limited to, electric motor-driven power tools; electric vehicles (EVs), hybrid electric vehicles (HEVs), and plug-in hybrid electric vehicles (PHEVs); electric two-wheeled vehicles such as e-bikes and e-scooters; electric golf carts; and systems for storing power.

BRIEF DESCRIPTION OF THE DRAWINGS

The above and other objects, features and other advantages of the present invention will be more clearly understood from the following detailed description taken in conjunction with the accompanying drawings, in which:

FIG. 1 illustrates an SEM image before rolling after coating a slurry for a positive electrode mix according to Example 1 of the present invention on a current collector;

FIG. 2 illustrates an SEM image after coating and rolling a slurry for a positive electrode mix according to Example 1 of the present invention on a current collector; and FIG. 3 illustrates an SEM image after coating and rolling a slurry for a positive electrode mix according to Comparative Example 1 of the present invention on a current collector.

MODE FOR INVENTION

Now, the present invention will be described in more detail with reference to the accompanying drawings. These examples are provided for illustrative purposes only and should not be construed as limiting the scope and spirit of the present invention.

Example 1

Using $LiFePO_4$ (product name: EXM2274) manufactured by Clariant, secondary particles having an average particle diameter of 10 micrometers were prepared in a ratio of 95% based on the total volume of $LiFePO_4$. In addition, $LiNi_{1/3}Mn_{1/3}Co_{1/3}O_2$ secondary particles having an average particle diameter of 30 micrometers were prepared in ratio of 95% based on the total volume of $LiNi_{1/3}Mn_{1/3}CO_{1/3}O_2$. Subsequently, the $LiFePO_4$ manufactured by Clariant (product name: EXM2274) and $LiNi_{1/3}Mn_{1/3}Co_{1/3}O_2$ were mixed in a ratio of 3:7 based on the total weight of positive electrode active material.

92% by weight of the positive electrode active material, 3% by weight of Super-P as a conductive material and 5% by weight of PVdF as a binder were added to NMP to prepare a slurry for a positive electrode mix. Subsequently, the slurry was coated, dried and rolled on a side of aluminum foil, thereby manufacturing a positive electrode.

Comparative Example 1

A positive electrode was manufactured in the same manner as in Example 1, except that a ratio of secondary particles was 95% based on the total volume of LiFePO$_4$ using LiFePO$_4$ (product name: BASF400) manufactured by BASF as a positive electrode active material.

Experimental Example 1

Secondary particle volume ratios in LiFePO$_4$ and LiNi$_{1/3}$Mn$_{1/3}$Co$_{1/3}$O$_2$ after rolling according to Example 1 and Comparative Example 1 were measured.

In Example 1, a ratio of LiNi$_{1/3}$Mn$_{1/3}$Co$_{1/3}$O$_2$ secondary particles was 85% based on the total volume of LiNi$_{1/3}$Mn$_{1/3}$Co$_{1/3}$O$_2$, and a ratio of LiFePO$_4$ primary particles was 90% based on the total volume of LiFePO$_4$.

In Comparative Example 1, a ratio of LiNi$_{1/3}$Mn$_{1/3}$Co$_{1/3}$O$_2$ secondary particles was 90% based on the total volume of LiNi$_{1/3}$Mn$_{1/3}$C$_{1/3}$O$_2$ and a ratio of LiFePO$_4$ primary particles was 45% based on the total volume of LiFePO$_4$.

Experimental Example 2

FIG. 1 illustrates a cross-sectional SEM image of the positive electrode before rolling, and FIG. 2 illustrates a cross-sectional SEM image of the positive electrode after rolling, according to Example 1. FIG. 3 illustrates a cross-sectional SEM image of the positive electrode after rolling according to Comparative Example 1.

Referring to FIG. 2 below, it can be confirmed that, in the positive electrode for secondary batteries according to the present invention, the lithium iron phosphate having an olivine crystal structure is collapsed to primary particles upon rolling and most of the lithium nickel-manganese-cobalt composite oxide particles maintain a shape thereof.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As described above, since, in a positive electrode for secondary batteries according to the present invention, lithium iron phosphate secondary particles having an olivine crystal structure may be preferentially collapsed to primary particles in a rolling process, greater than 50% of lithium iron phosphate particles may exist as primary particles based on the total volume of lithium iron phosphate and greater than 50% of lithium nickel-manganese-cobalt composite oxide particles may exist as secondary particles formed by agglomeration of primary particles, based on the total volume of lithium nickel-manganese-cobalt composite oxide.

Therefore, since the lithium iron phosphate particles having an olivine crystal structure according to the present invention have a secondary particle shape, in which primary particles are agglomerated, up to a mixing process of a positive electrode mix slurry and a process of coating on a current collector, energy density may be ultimately maximized due to collapse of secondary particles to primary particles in a rolling process, and battery capacity characteristics and output characteristics may also be enhanced, while enhancing process efficiency.

The invention claimed is:

1. A positive electrode for secondary batteries manufactured by coating and rolling a slurry for a positive electrode mix comprising positive electrode active material particles on a current collector, wherein the positive electrode active material particles comprise lithium iron phosphate particles having an olivine crystal structure and lithium nickel-manganese-cobalt composite oxide particles according to Formula 1, a ratio of the lithium iron phosphate particles to the lithium nickel-manganese-cobalt composite oxide particles is 30:70 to 70:30 based on a total weight of positive electrode active material, the lithium nickel-manganese-cobalt composite oxide particles in an amount of greater than 50% and less than 90% based on the total volume of lithium nickel-manganese-cobalt composite oxide exist as secondary particles formed by agglomeration of primary particles, and the lithium iron phosphate particles in an amount of greater than 50% and less than 100% based on the total volume of lithium iron phosphate exist as primary particles:

$$Li_{1+z}Ni_bMn_cCo_{1-(b+c+d)}M_dO_{(2-e)}A_e \quad (1),$$

wherein −0.5≤z≤0.5, 0.1≤b≤0.8, 0.1≤c≤0.8, 0≤d≤0.2, 0≤e≤0.2, b+c+d<1, M is Al, Mg, Cr, Ti, Si or Y, and A is F, P or Cl.

2. The positive electrode according to claim 1, wherein the lithium nickel-manganese-cobalt composite oxide particles in an amount of 80% or more and less than 90% based on a total volume of lithium nickel-manganese-cobalt composite oxide exist as secondary particles formed by agglomeration of primary particles.

3. The positive electrode according to claim 1, wherein the lithium iron phosphate particles in an amount of 70% or more and less than 100% based on a total volume of lithium iron phosphate exist as primary particles.

4. The positive electrode according to claim 1, wherein a particle change ratio based on volume when positive electrode active material particles in a secondary particle state are changed into primary particles by the rolling is 70% or more in the lithium iron phosphate particles and 20% or less in the lithium nickel-manganese-cobalt composite oxide particles.

5. The positive electrode according to claim 4, wherein the particle change ratio of the lithium iron phosphate particles is 80% or more.

6. The positive electrode according to claim 4, wherein the particle change ratio of the lithium nickel-manganese-cobalt composite oxide is 10% or less.

7. The positive electrode according to claim 4, wherein, in the secondary particles, primary particles are agglomerated through physical bonding.

8. The positive electrode according to claim 4, wherein an average particle diameter of the primary particles of the lithium iron phosphate particles and the lithium nickel-manganese-cobalt composite oxide particles is 50 nanometers to 550 nanometers and an average particle diameter of the secondary particles of the lithium iron phosphate particles and the lithium nickel-manganese-cobalt composite oxide particles is 5 micrometers to 100 micrometers.

9. The positive electrode according to claim 4, wherein the secondary particles of the lithium iron phosphate particles and the lithium nickel-manganese-cobalt composite oxide particles have a globular shape.

10. The positive electrode according to claim 1, wherein the lithium iron phosphate particles are coated with a conductive material.

11. The positive electrode according to claim 10, wherein the conductive material is coated to a thickness of 1 nanometer or more and 10 nanometers or less.

12. The positive electrode according to claim 10, wherein a content of the conductive material is 1% to 4% by weight based on a total weight of lithium iron phosphate.

13. The positive electrode according to claim 1, wherein the lithium iron phosphate particles have a composition of Formula 2 below:

$$Li_{1+a}Fe_{1-x}M_x(PO_{4-b'})X_{b'} \quad (2),$$

wherein M is one or more selected from Al, Mg and Ti, X is one or more selected from F, S and N, and $0.5 \leq a \leq +0.5$, $0 \leq x \leq 0.5$, and $0 \leq b' \leq 0.1$.

14. The positive electrode according to claim 1, wherein the lithium nickel-manganese-cobalt composite oxide of Formula 1 is composed of a layered lithium nickel-manganese-cobalt oxide according to Formula 1a below:

$$Li_{1+z}Ni_bMn_cCO_{1-(b+c)}O_2 \quad (1a)$$

wherein b, c, and z are the same as defined in claim 1.

15. The positive electrode according to claim 14, wherein a content (b) of the nickel is $0.3 \leq b \leq 0.65$.

16. A secondary battery comprising the positive electrode according to claim 1.

17. A battery pack comprising one or more secondary batteries as claimed in claim 16.

18. A device comprising the battery pack according to claim 17.

19. The device according to claim 18, wherein the device is an electric vehicle, a hybrid electric vehicle, a plug-in hybrid electric vehicle or a system for storing power.

* * * * *